(12) United States Patent
Hautvast (10) Patent No.: US 9,478,013 B2
(45) Date of Patent: Oct. 25, 2016

(54) SYSTEM AND METHOD FOR REGISTERING AN IMAGE SEQUENCE (71) Applicant: KONINKLIJKE PHILIPS N.V., Eindhoven (NL)

(72) Inventor: Guillaume Leopold Theodorus Frederik Hautvast, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 71 days.

(21) Appl. No.: 14/405,437

(22) PCT Filed: Jun. 28, 2013

(86) PCT No.: PCT/IB2013/055321
§ 371 (c)(1),
(2) Date: Dec. 4, 2014

(87) PCT Pub. No.: WO2014/002068
PCT Pub. Date: Jan. 3, 2014

(65) Prior Publication Data
US 2015/0147002 A1 May 28, 2015

Related U.S. Application Data (60) Provisional application No. 61/665,337, filed on Jun. 28, 2012.

(51) Int. Cl.
G06K 9/32 (2006.01)
G06T 5/00 (2006.01)
G06T 7/00 (2006.01)

(52) U.S. Cl.
CPC .......... G06T 5/002 (2013.01); G06T 7/0024 (2013.01); G06T 7/0038 (2013.01); G06T 2207/10016 (2013.01); G06T 2207/20182 (2013.01); G06T 2207/30004 (2013.01)

(58) Field of Classification Search
CPC .... G06K 9/32; G06K 9/6206; G06K 9/6207; G06K 9/6212; G06K 2009/00932; G06K 2209/05; H04N 1/58; H04N 5/144; H04N 5/21; H04N 5/213; H04N 5/262; H04N 9/093; H04N 9/11; H04N 9/43; G06T 3/0068; G06T 3/403; G06T 5/002; G06T 5/30; G06T 5/50; G06T 7/0012; G06T 7/0024; G06T 7/0028; G06T 7/0034; G06T 7/0036; G06T 7/0038; G06T 7/0083; G06T 7/0085; G06T 7/2006; G06T 7/206; G06T 11/001; G06T 13/80; G06T 2207/20192; G06T 2207/30016; G06T 2207/30048
See application file for complete search history.

(56) References Cited

U.S. PATENT DOCUMENTS 7,333,670 B2 2/2008 Sandrew
7,519,225 B2 4/2009 Arora et al.
(Continued)

OTHER PUBLICATIONS

Adluru, G., et al.; Model-Based Registration for Dynamic Cardiac Perfusion MRI; 2006; Journal of Magnetic Resonance Imaging; 24:1062-1070.
(Continued)

Primary Examiner — Jose Couso (57) ABSTRACT

A system (100) for registering an image sequence includes an input (120) for obtaining the image sequence (200) which includes a plurality of images (201-205) arranged sequentially within an image range. A transformation processor (140) establishes transformations between pairs of consecutive images in the image sequence (200) to obtain a plurality of transformations (211-214). An alignment processor (160) based on the plurality of transformations (211-214), establishes a reference image (203) from the plurality of images (201-205) based on a transformation metric and aligns the image sequence (200) to the reference image (203) to obtain a registered image sequence (230). The transformation metric quantifies a degree of transformation required for aligning the image sequence (200) to the reference image (203).

20 Claims, 3 Drawing Sheets

(56) References Cited

U.S. PATENT DOCUMENTS

| | | | |
|---|---|---|---|
| 7,912,259 B2* | 3/2011 | Arditi | G06T 7/0034 |
| | | | 382/128 |
| 7,995,864 B2 | 8/2011 | Mullick et al. | |
| 8,064,664 B2 | 11/2011 | Suri et al. | |
| 8,094,972 B2 | 1/2012 | Perlmutter et al. | |
| 8,406,491 B2* | 3/2013 | Gee | G06T 7/0024 |
| | | | 382/128 |
| 8,682,054 B2* | 3/2014 | Xue | G06T 7/0028 |
| | | | 382/131 |
| 8,989,461 B2* | 3/2015 | Zhu | G06K 9/6207 |
| | | | 382/128 |

OTHER PUBLICATIONS

Guimond, A., et al.; Average Brain Models: A Convergence Study; 2000; Computer Vision and Image Understanding; 77:192-210.

Harabis, V., et al.; Registration of Ultrasound Image Sequences for Perfusion Analysis; 2011; EUSIPCO; pp. 1015-1019.

Imiya, A., et al.; A Metric of Planar Self-Similar Forms; 1996; Advances in Structural and Syntactical Pattern Recognition; Springer; pp. 100-109.

Joshi, S., et al.; Unbiased diffeomorphic atlas construction for computational anatomy; 2004; NeuroImage; 23:S151-S160.

Marsland, S., et al.; Groupwise Non-rigid Registration Using Polyharmonic Clamped-Plate Splines; 2003; MICCAI-LNCS; 2879:771-779.

Milles, J., et al.; Fully automated motion correction in first-pass myocardial perfusion MR image sequences; 2008; IEEE Trans. Med. Imaging; 11:1611-1621.

Park, H., et al.; Least Biased Target Selection in Probabilistic Atlas Construction; 2005; MICCAI-LNCS; 3750:419-426.

Stegmann, M. B., et al.; Unsupervised Motion-compensation of Multi-slice Cardiac Perfusion MRI; 2005; Medical Image Analysis; 9(4)394-410.

Wu, G., et al.; SharpMean: Groupwise registration guided by sharp mean image and tree-based registration; 2011; NeuroImage; 56:1968-1981.

Zhang, W., et al.; Spatio-temporal Registration of Real Time 3D Ultrasound to Cardiovascular MR Sequences; 2007; MiCCAI-LNCS; 4791:343-350.

\* cited by examiner

SYSTEM AND METHOD FOR REGISTERING AN IMAGE SEQUENCE

CROSS REFERENCE TO RELATED APPLICATIONS

This application is a national filing of PCT application Serial No. PCT/IB2013/055321, filed Jun. 28, 2013, published as WO 2014/002068 A2 on Jan. 3, 2014, which claims the benefit of U.S. provisional application Ser. No. 61/665,337 filed Jun. 28, 2012, which is incorporated herein by reference.

FIELD OF THE INVENTION

The invention relates to a system and a method for registering an image sequence. The invention further relates to a workstation and imaging system comprising the system, and to a computer program product for enabling performing the method.

In the fields of image viewing and image display, it may be desirable to geometric align two images which comprise a same or similar object. Such geometrically aligning is commonly known as image registration, and is considered to be a fundamental task in numerous image processing applications. Image registration may be used, for example, when a medical image from a base-line examination of a patient is to be compared to a further medical image from a follow-up examination. As the patient may be positioned differently in both medical images, image registration may be used to compensate for the differences in both medical images due to the change in position of the patient.

Image registration generally involves i) establishing transformations between two images by maximizing a similarity measure between the two images, ii) based on the transformations, aligning the two images. The maximization may be performed using numerical optimization methods, e.g. gradient descent, controlling the parameters of the transformation. The transformations may be, e.g., rigid, affine or flexible.

BACKGROUND OF THE INVENTION

Image registration may also be applied to image sequences, i.e., to more than two images. Such image registration is frequently used to compensate for motion occurring within the image sequence. For example, in perfusion cardiac MRI sequences, the respiratory motion of a patient may hinder a clinician in studying the image sequence. Image registration may be used to compensate for the respiratory motion, i.e., to stabilize the image sequence.

For example, a publication titled *"Registration of Ultrasound Image Sequences for Perfusion Analysis"*, by Vratislav Harabis et al, EUSIPCO, August 2011, pp. 1015-1019, describes a method for registration of images in ultrasound sequences when a contrast agent is administrated in the blood stream. It is said that that selection of a reference image in registration of the contrast sequence is one of the main problems. It is said that a first possibility for the selection is based on a floating reference image, where a second image is registered to a first image, a third image is registered to the second image, etc. A second possibility is to set only one reference image, and to register the other images in the sequence with respect to this fixed image. The publication proposes a different method based on registration of subsequences. The original sequence is automatically divided to subsequences based on contrast values. In each subsequence, one image with the highest value of a CROI metric is set as reference for the registration of the subsequence. The CROI metric is based on pixel intensity differences in a region of interest (ROI). Finally, mean images from each registered subsequences are computed and used for registration of subsequences together.

A problem of the aforementioned method is that the registering of an image sequence can cause distortions to occur in the registered image sequence.

SUMMARY OF THE INVENTION

It would be advantageous to have a system or method for registering an image sequence which reduces the distortions occurring in the registered image sequence.

To better address this concern, a first aspect of the invention provides a system for registering an image sequence, comprising:
  an input for obtaining the image sequence, the image sequence comprising a plurality of images arranged sequentially within an image range;
  a transformation processor for establishing transformations between pairs of consecutive images in the image sequence to obtain a plurality of transformations;
  an alignment processor for, based on the plurality of transformations, aligning the image sequence to a reference image to obtain a registered image sequence;
  wherein the alignment processor is arranged for establishing the reference image from the plurality of images based on a transformation metric, the transformation metric quantifying a degree of transformation required for aligning the image sequence to the reference image.

In a further aspect of the invention, a workstation and an imaging apparatus is provided comprising the system set forth.

In a further aspect of the invention, a method is provided for registering an image sequence, comprising:
  obtaining the image sequence, the image sequence comprising a plurality of images arranged sequentially within an image range;
  establishing transformations between pairs of consecutive images in the image sequence to obtain a plurality of transformations;
  based on the plurality of transformations, aligning the image sequence to a reference image to obtain a registered image sequence;
  wherein said aligning comprises establishing the reference image from the plurality of images based on a transformation metric, the transformation metric quantifying a degree of transformation required for aligning the image sequence to the reference image. In a further aspect of the invention, a computer program product is provided comprising instructions for causing a processor system to perform the method set forth.

The present invention involves registering an image sequence. The image sequence is formed by a series of images which are ordered, i.e., each image has a particular position with respect to the others of the series of images. The order may be, e.g., a time-based order. The image sequence has an image range, with the boundaries of the image range being defined by a first and a last one of the series of images. The image sequence is obtained in that it may be received from an internal or external source, e.g., a storage medium.

Transformations are established between pairs of consecutive images in the series of images. Each of the transformations is indicative of the transformation between a pair of consecutive images. Here, the term consecutive refers to the images of an image pair following each other in the ordering of the images, i.e., being neighboring images within the image sequence. The transformation is a function or parameters which indicate how one of a pair of images can be transformed so as to at least in part match the other image.

The transformations are used to align the image sequence with respect to a reference image. Hence, other images from the image sequence are transformed so as to at least in part match the reference image, with the reference image serving as stable, non-transformed image amongst the series of images. Essentially, the reference image constitutes a so-termed anchor image with respect to which the image sequence is aligned.

It is noted that image registration is thus performed by i) establishing the transformations and ii) based on the transformation, aligning the image sequence.

The reference image is established from the plurality of images. Hence, the plurality of images is used to, either directly or indirectly, provide the reference image. To establish which image is established as the reference image, a transformation metric is used. The transformation metric is a function, e.g., a mathematical function, which indicates how much transformation is needed, i.e., to what degree the series of images needs to be transformed, in order to align the image sequence to a reference image. The transformation value obtained therefore depends on which image is established as the reference image.

The inventor(s) has (have) recognized that the choice of reference image greatly affects the quality of the image registration as perceived by a user. A reason for this is that the reference image, by serving as a basis for the image registration, causes the series of images to be transformed so as to at least in part resemble the reference image. In case the reference image is an image which is of lesser or no interest to the user, for example, because it does not or not clearly show a region of interest, the series of images is transformed so as to at least in part resemble an image which is of lesser or no interest to the user. The inventor(s) has (have) further recognized that such images frequently constitute outliers within the image sequence which differ in appearance from other images within the image sequence.

By providing a transformation metric which quantifies a degree of transformation required for aligning the image sequence to the reference image, it can be determined how much transformation is needed to align the image sequence to a particular reference image. The degree of transformation is indicative of how similar the reference image is to other images from the image sequence, since for an image that is similar to most images from the image sequence, a low degree of transformation will be needed, i.e., only for those images that are dissimilar. However, for an image that differs in appearance from most images from the image sequence, a high degree of transformation will be needed, i.e., most images from the image sequence need to be transformed in order to resemble the reference image. Thus, a transformation metric is provided which indicates whether an image established as reference image constitutes an outlier within the image sequence.

By establishing the reference image from the image sequence based on the transformation metric, the reference image is established based on to what degree said image constitutes an outlier within the image sequence. As such, outliers within the image sequence can be avoided when establishing the reference image. Advantageously, a reference image can be established which resembles the other images within the image sequence. Advantageously, the likelihood that an image which is of lesser or no interest to the user is established as the reference image is reduced. Advantageously, distortions can be avoided which may otherwise be introduced by establishing an image as reference image which is distorted and therefore constitutes an outlier within the image sequence, since it is avoided that other images are transformed to at least in part resemble the distorted image.

Optionally, the alignment processor is arranged for establishing the reference image by selecting the reference image from the plurality of images based on a minimization of the transformation metric. The reference image is specifically selected to minimize the transformation metric. Hence, an image is established as reference image which causes the lowest degree of transformation to be needed when aligning the image sequence to the reference image. Advantageously, if one or more of the transformations are erroneously established, e.g., due to a lack of contrast within the images, distortions, which otherwise may occur due to image registration being based on said transformations, are reduced since the reference image requires a lowest degree of transformations in the image registration.

Optionally, the alignment processor is arranged for establishing the reference image by i) for at least a subset of the plurality of images, calculating a transformation value based on the transformation metric, and ii) selecting one of said images having a lowest transformation value as the reference image. The reference image is established by calculating the transformation value for a number of images, i.e., candidate images, and selecting one of said images which has the lowest transformation value. The reference image is thus one of the plurality of images, i.e., an existing image, and the selection is based on comparing transformation values. This constitutes an effective selection mechanism.

Optionally, the alignment processor is arranged for establishing an interpolated image as the reference image, the interpolated image having a position in the image range between a pair of consecutive images in the image sequence. The reference image corresponds to an interpolated image and not to an existing image amongst the plurality of images. An interpolated image may be best suited for serving as the reference image. For example, if the image sequence depicts respiratory motion, a lowest transformation value may be obtained for a point in the respiratory motion which falls between a pair of consecutive images in the image sequence. By aligning the image sequence with respect to said point, a better quality image registration can be obtained.

It is noted that the interpolated image may not need to be explicitly computed or be available to the system in order to align the image sequence to the interpolated image. Rather, the interpolated image may be represented by a position between a pair of consecutive images, and the image sequence may be aligned to a virtual interpolated image based on the transformation between the pair of consecutive images and said position.

Optionally, the alignment processor is arranged for establishing a region of interest in the image sequence, and the transformation metric quantifies a degree of transformation required for aligning the region of interest in the image sequence to the region of interest in the reference image. A region of interest shown in the image sequence, i.e., in at least part of the plurality of images, may be of particular interest to a user. By quantifying the degree of transformation specifically with respect to the region of interest in the image sequence, the reference image is established based on the degree of transformation of the region of interest when aligning the image sequence to the reference image.

Optionally, the system further comprises a region of interest detector for detecting the region of interest in the image sequence. The system thus automatically detects a region of interest and establishes the reference image based on the region of interest.

Optionally, the transformation processor is arranged for establishing the transformations between the pairs of consecutive images as transformation matrices. Transformation matrices are well suited for describing the transformations between the pairs of consecutive images and for serving as a basis for a transformation metric.

Optionally, the alignment processor is arranged for quantifying the degree of transformation based on multiplication of the transformation matrices of adjacent pairs of consecutive images. By multiplying the transformation matrices of adjacent pairs of consecutive images, a transformation matrix product is obtained which provides the overall degree of transformation due to said individual transformations. Based thereon, the degree of transformation required for aligning the image sequence can be efficiently calculated.

Optionally, the alignment processor is arranged for quantifying the degree of transformation by i) for each of the plurality of images, establishing a transformation matrix product being indicative of the transformation from a respective one of the plurality of images to the reference image, and ii) establishing a transformation value based on a sum of the transformation matrix products. Hence, for each of the plurality of images, the degree of transformation is calculated which is required to transform said image to the reference image. By summing said amounts, the overall degree of transformation required for aligning the image sequence, i.e., each of the plurality of images, can be efficiently calculated.

Optionally, the transformation matrix is a 4×4 transformation matrix. A 4×4 transformation matrix is well suited for describing rigid, affine or flexible transformations.

Optionally, the alignment processor is arranged for generate a confidence value based on the transformation metric, the confidence value being indicative of a quality of aligning the image sequence to the reference image. This optional aspect of the present invention is based on the recognition that the degree of transformation required for aligning the image sequence to the reference image is indicative of a quality of aligning the image sequence to the reference image. By generating a confidence value reflecting said quality, the user is provided with feedback on the quality of the registered image sequence.

Optionally, the alignment processor is arranged for establishing the reference image from the plurality of images further based on an image similarity metric, the image similarity metric quantifying a degree of correspondence obtained when aligning the image sequence to the reference image.

Optionally, the alignment processor is arranged for establishing the reference image from the plurality of images further based on a position of the reference image within the image range. This optional aspect of the present invention is based on the recognition that the position of an image within the image range is indicative of its suitability as reference image. For example, in image acquisition, initialization problems may occur which may affect the first image or images of the image sequence. Hence, said first image or images are less suited as reference image. As another example, in perfusion imaging, uptake of a contrast agent in a region of interest may be highest near a middle of the image sequence, resulting in the region of interest being most visible near said middle.

It will be appreciated by those skilled in the art that two or more of the above-mentioned embodiments, implementations, and/or aspects of the invention may be combined in any way deemed useful.

Modifications and variations of the workstation, the imaging apparatus, the method, and/or the computer program product, which correspond to the described modifications and variations of the system, can be carried out by a person skilled in the art on the basis of the present description.

A person skilled in the art will appreciate that the method may be applied to multi-dimensional image data, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM). A dimension of the multi-dimensional image data may relate to time. For example, a three-dimensional image may comprise a time domain series of two-dimensional images.

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
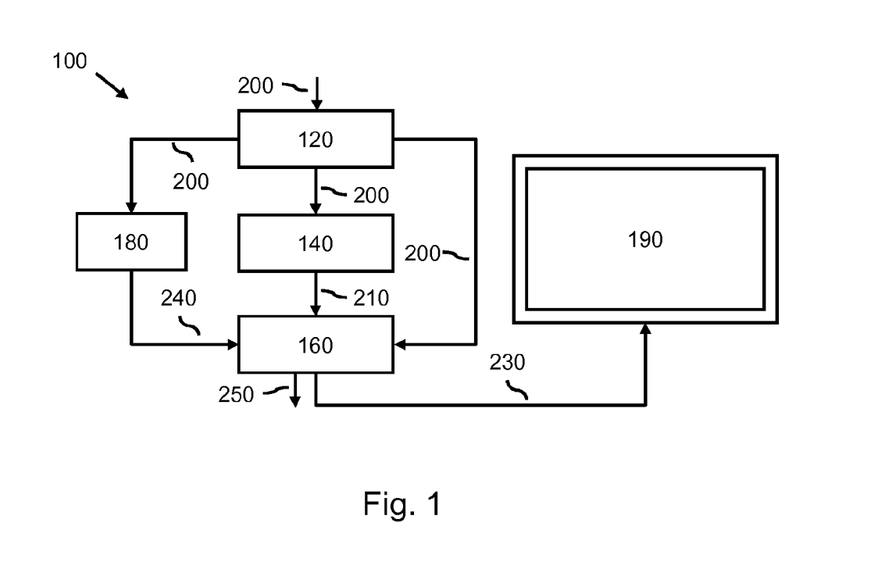
FIG. 1 shows a system according to the present invention.

FIG. 1 shows a system 100 for registering an image sequence 200. The system 100 comprises an input 120 for obtaining the image sequence 200. The system 100 further comprises a transformation processor 140 for establishing transformations between pairs of consecutive images in the image sequence 200 to obtain a plurality of transformations 210. The transformation processor 140 is shown to receive the image sequence 200 from the input 120. The system 100 further comprises an alignment processor 160 for, based on the plurality of transformations 210, aligning the image sequence 200 to a reference image to obtain a registered image sequence 230. The alignment processor 160 is shown to receive the image sequence 200 from the input 120, and to receive the plurality of transformations 210 from the transformation processor 140. In the example of FIG. 1, the alignment processor 160 is shown to provide the registered image sequence 230 to a display 190 for display to a user. Alternatively or additionally, the alignment processor 160 may store or transmit the registered image sequence 230, e.g., on a storage medium or to a server. Also shown in FIG. 1 is the alignment processor 160 being optionally arranged for generating a confidence value 250 based on the transformation metric, as will be discussed further onwards.

The operation of the system 100 may be briefly explained as follows. Before, or as part of, the registering of the image sequence, the alignment processor 160 establishes the reference image from the plurality of images based on a transformation metric. The transformation metric quantifies a degree of transformation required for aligning the image sequence 200 to the reference image. The alignment processor 160 thus performs the image alignment using the reference image as established based on the transformation metric.

Figure 2:
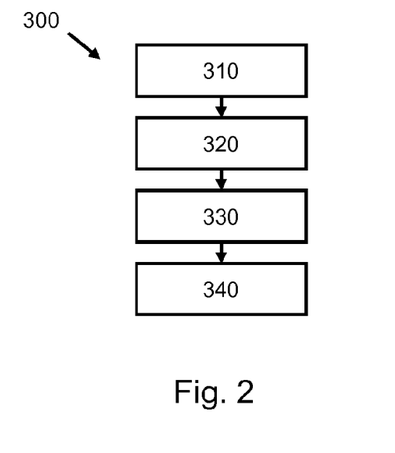
FIG. 2 shows a method according to the present invention.

FIG. 2 shows a method 300 for registering an image sequence. The method 300 comprises, in a step titled "OBTAINING IMAGE SEQUENCE", obtaining 310 the image sequence, the image sequence comprising a plurality of images arranged sequentially within an image range. The method 300 further comprises, in a step titled "ESTABLISHING TRANSFORMATIONS", establishing 320 transformations between pairs of consecutive images in the image sequence to obtain a plurality of transformations. The method 300 further comprises, in a step titled "ALIGNING IMAGE SEQUENCE", based on the plurality of transformations, aligning 340 the image sequence to a reference image to obtain a registered image sequence. The method 300 further comprises, in a step titled "ESTABLISHING REFERENCE IMAGE", establishing 330 the reference image from the plurality of images based on a transformation metric, the transformation metric quantifying a degree of transformation required for aligning the image sequence to the reference image.

Figure 3:
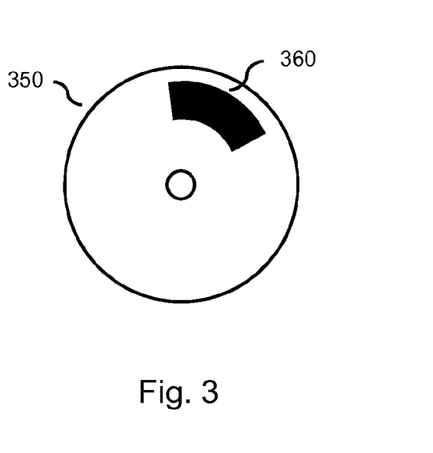
FIG. 3 shows a computer program product according to the present invention.

The method 300 may correspond to an operation of the system 100. However, it is noted that the method 300 may also be performed in separation of the system 100. FIG. 3 shows a computer program product 360 comprising instructions for causing a processor system to perform the aforementioned method 300. The computer program product 360 may be comprised on a computer readable medium 350, for example in the form of as a series of machine readable physical marks and/or as a series of elements having different electrical, e.g., magnetic, or optical properties or values.

Figure 4A:
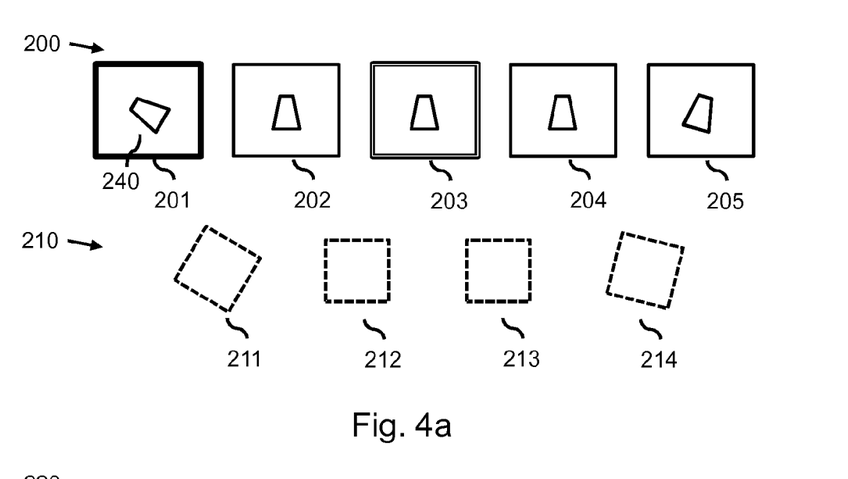
FIG. 4a shows an image sequence comprising a plurality of images, with transformations between pairs of consecutive images being schematically indicated.

The operation of the system 100 may be explained in more detail as follows. FIG. 4a shows an image sequence 200 comprising a plurality of images 201-205. In this particular example, the image sequence 200 is chosen to be a temporal image sequence, with each of the plurality of images 201-205 showing a region of interest 240 at a different point in time. However, the image sequence 200 may also constitute a different type of sequence, e.g., showing a region of interest from different spatial viewpoints. It is noted that for readability reasons, the region of interest 240 is only indicated once with a reference number in FIGS. 4a-4c. From FIG. 4a, it can be seen that the region of interest 240 changes throughout the image sequence 200. In particular, in a first image 201 of the image sequence 200, the region of interest 240 is rotated counterclockwise with respect to a second, third and fourth image 202-204 of the image sequence 200. Moreover, in a first image 205 of the image sequence 200, the region of interest 240 is rotated clockwise with respect to said images.

The change in orientation may be due to various reasons. For example, the region of interest 240 may be an organ of a patient, and the change in orientation may be due to respiratory movement causing the region of interest 240 to change in orientation over the time span of the image sequence. Alternatively or additionally, the respiratory movement may cause a change in position of the region of interest 240 or cause a change in appearance over time. For sake of explanation, however, FIG. 4a only shows the change in orientation.

FIG. 4a further shows a result of the transformation processor 140 establishing transformations between pairs of consecutive images in the image sequence 200. As a result, a plurality of transformations 211-214 is obtained, with the transformations being schematically indicated in FIG. 4a as dashed squares. Here, an orientation of a dashed square denotes a change in orientation of the region of interest 240 between a pair of consecutive images. For example, transforming the first image 201 to the second image 202 so that the region of interest 240 shown therein matches in position and orientation involves rotating the first image 201 clockwise. Hence, the first transformation 211 is schematically indicated with a dashed square being oriented towards the right. FIG. 4a further shows a second transformation 212 indicating the transformation from the second image 202 to the third image 203, a third transformation 213 indicating the transformation from the third image 203 to the fourth image 204, and a fourth transformation 214 indicating the transformation from the fourth image 204 to the fifth image 205. Since the region of interest 240 has a same orientation in the second, third and fourth image 202-204, the second and third transformations 212-213 are neutral, i.e., indicating no change in orientation. Moreover, the fifth image 205 shows the region of interest 240 being again rotated clockwise, with the fourth transformation 214 reflecting said rotation by being oriented towards the right.

The transformation processor 140 may establish the plurality of transformations using any suitable transformation technique, such as the techniques known per se from the technical fields of image registration and motion estimation. In particular, the transformation processor 140 may establish the transformations 211-214 between the pairs of consecutive images as transformation matrices. The transformation matrices may be 4×4 matrices. The transformations may be rigid, affine or flexible. The transformation processor 140 may be arranged for establishing each of the transformations for substantially an entire image. Alternatively, the transformation processor 140 may be arranged for establishing the transformations for a portion of the image, e.g., specifically for the region of interest 240. For the latter purpose, as also shown in FIG. 1, the system may comprise a region of interest detector 180 for detecting the region of interest 240 in the plurality of images 201-205.

Figure 4B:
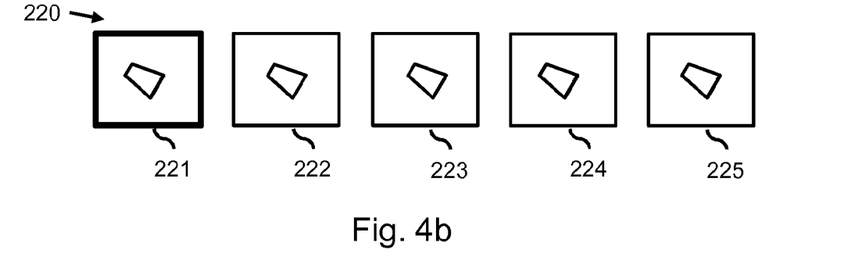
FIG. 4b shows a result of aligning the image sequence, with a first one of the plurality of images being established as a reference image in the image registration.

FIG. 4b shows a result of the alignment processor 160, based on the plurality of transformations 211-214, aligning the image sequence 200 to a reference image 201 to obtain a registered image sequence 220. FIG. 4b, however, shows a prior art example, in which, per default, the first image 201 is established as the reference image. This is indicated in FIGS. 4a and 4b by the reference image being shown with a widened border. As a result, a registered image sequence 220 is obtained in which the orientation of the region of interest 240 is adjusted so as to match that of the region of interest in the first image 201.

Figure 4C:
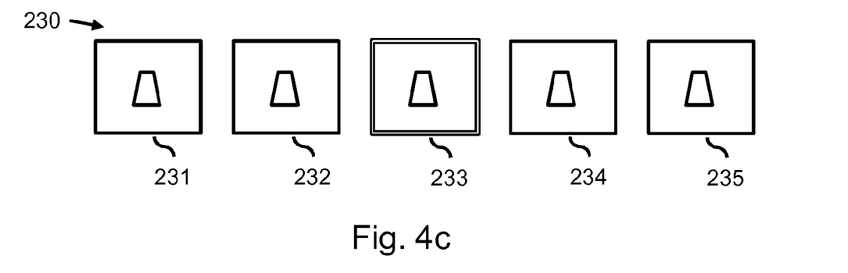
FIG. 4c shows a result of aligning the image sequence, with the reference image being established based on a transformation metric.

FIG. 4c shows a result of the alignment processor 160 establishing the reference image from the plurality of images 201-205 based on a transformation metric. The transformation metric quantifies a degree of transformation required for aligning the image sequence 200 to the reference image 203. As a result, instead of the first image 201, the third image 203 is established as the reference image 203. This is indicated in FIGS. 4a and 4c by the reference image 203 being shown with a double lined border. As a result, a registered image sequence 230 is obtained in which the orientation of the region of interest 240 is adjusted so as to match that of the region of interest in the third image 203.

The above establishing of the reference image based on the transformation metric may be explained in more detail as follows. The transformation metric quantifies a degree of transformation required for aligning the image sequence 200 to the reference image 203. The alignment processor 160 may be arranged for establishing the reference image 203 by selecting the reference image from the plurality of images 201-205 based on a minimization of the transformation metric. For example, the alignment processor 160 may be arranged for establishing the reference image 203 by, for each of the plurality of images 201-205, calculating a transformation value based on the transformation metric, and selecting one of said images having a lowest transformation value as the reference image 203.

For example, when the transformations 211-214 are established as transformation matrices, the transformation value may be calculated for the first image 201 as follows. The transformation involved in transforming the second image 202 to the first image 201 may correspond to a matrix inverse of the first transformation matrix 211. The degree of transformation may correspond to calculating a L2 norm of the matrix inverse of the first transformation matrix 211. Similarly, the transformation involved in transforming the third image 202 to the first image 201 may correspond to a matrix inverse of a product of the first transformation matrix 211 and the second transformation matrix 212. The degree of transformation may correspond to calculating a L2 norm of the matrix inverse of said product. By applying the above calculation also to the fourth image 204 and the fifth image 205, a plurality of transformation degrees are obtained, which may be summed together to obtain a transformation value expressing the degree of transformation required for aligning the image sequence 200 to the first image 201, i.e., the degree of transformation required for aligning the second, third, fourth and fifth image 202-205 to the first image 201.

By repeating the above also for the other images of the plurality of images 201-205, a plurality of transformation values may be obtained, with each of the plurality of transformation values expressing the degree of transformation required for aligning the image sequence 200 to a corresponding one of the plurality of images 201-205.

The transformation values may be ordered and the image corresponding with a lowest transformation value may be selected as the reference image 203. In the example of FIG. 4a, this may correspond to the third image 203. A reason for this is that aligning the image sequence 200 to the first image 201 involves rotating the region of interest in the second, third, fourth and in the fifth image 202-205. The same holds for aligning the image sequence 200 to the fifth image 205. However, for each of the second, third and fourth image 202-204, aligning the image sequence 200 to each respective image only involves rotating the region of interest in the first image 201 and in the fifth image 205. Hence, the third image 203 may be established as the reference image since it involves an overall lowest degree of transformation, being in this case a lowest degree of rotation. Alternatively, either the second image 202 or the fourth image 204 may be established as the reference image.

FIG. 4c shows a result of the alignment processor 160 aligning the image sequence 200 to the third image 203 to obtain a registered image sequence 230. Compared to the registered image sequence 220 shown in FIG. 4b, it can be seen that the orientation of the region of interest 240 in FIG. 4c is more similar to a majority of the image sequence 200 than in FIG. 4b. It will be appreciated that selecting one of the plurality of images 201-205 which has a lowest transformation value as the reference image typically results in selecting one of the plurality of images 201-205 in which the region of interest 240 is shown in a most similar manner with respect to the other images, i.e., it constitutes a majority-based selection.

Figure 5A:
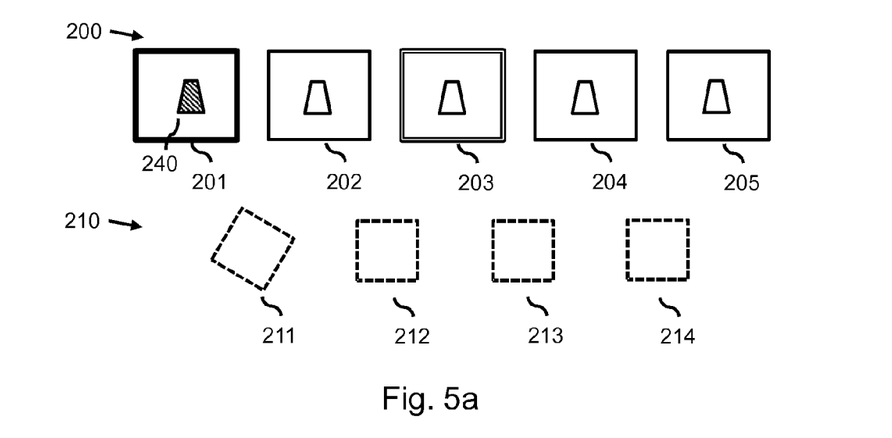
FIG. 5a shows another image sequence and corresponding transformations, with one of the transformations being established erroneously.

FIG. 5a shows another example of an image sequence 200 comprising a plurality of images 201-205. In this particular example, the image sequence 200 is chosen to represent a series of perfusion Cardiovascular Magnetic Resonance (CMR) images in which a contrast agent is provided intravenously to a patient. Here, due to the contrast agent slowly increasing in uptake over time, the region of interest 240 may be poorly visible in a first image 201 of the image sequence 200, e.g., due to an initially low uptake of contrast agent. As a result, the contrast between the region of interest 240 and the surrounding tissue may be poor in the first image 201. The low uptake is schematically indicated by the region of interest 240 being dashed in the first image 201. With the uptake of contrast agent increasing over time, the region of interest 240 is well visible in the second to the fifth image 202-205 of the image sequence 200, i.e., has sufficient contrast with the surrounding tissue.

FIG. 5a further shows a result of the transformation processor 140 establishing transformations between pairs of consecutive images in the image sequence 200. Due to the poor visibility of the region of interest 240 in the first image 201, the first transformation 211, i.e., between the first image 201 and the second image 202, may be established erroneously. As a result, a first transformation 211 may be obtained which does not accurately reflect the change in position, orientation, etc, of the region of interest 240. In this particular example, the region of interest 240 remains relatively static within the image sequence 200, i.e., does not change in position, orientation or appearance. The first transformation 211 therefore erroneously indicates a change in orientation, while the second, third and fourth transformation 212-214 correctly indicate the region of interest 240 remaining static.

Figure 5B:
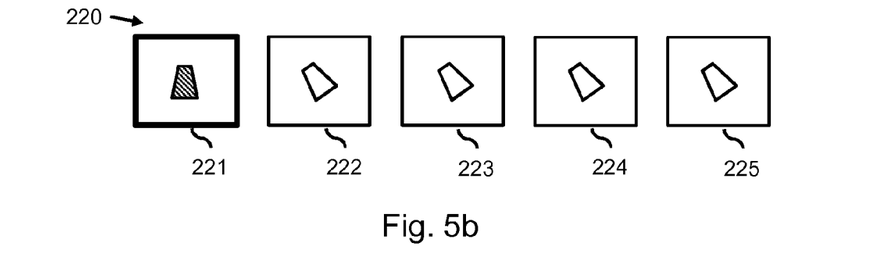
FIG. 5b shows a result of aligning the image sequence, with the first one of the plurality of images being established as the reference image.

FIG. 5b shows a result of the alignment processor 160 aligning the image sequence 200 to the first image 201 to obtain a registered image sequence 220, as may be obtained when, per default, the first image 201 is established as the reference image. It can be seen that due to the erroneous first transformation 211, the orientation of the region of interest 240 has changed in the second, third, fourth and fifth image 202-205.

Figure 5C:
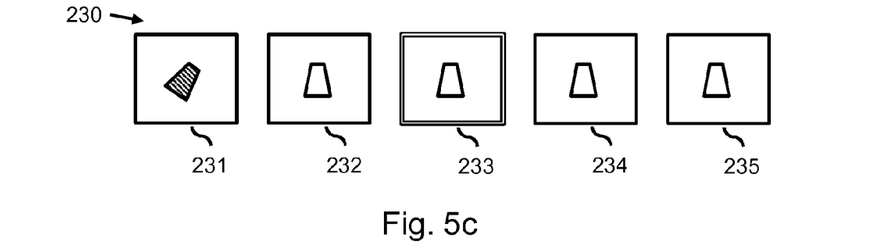
FIG. 5c shows a result of aligning the image sequence, with the reference image being established based on the transformation metric.

FIG. 5c shows a result of the alignment processor 160 establishing the reference image from the plurality of images 201-205 based on the transformation metric. As a result, the third image 203 is established as reference image 203. Consequently, a registered image sequence 230 is obtained in which the orientation of the region of interest 240 has only changed in the first image 201. When comparing FIG. 5b with FIG. 5c, it can be seen that, by establishing the reference image based on the transformation metric, it can be avoided that outliers in plurality of images 201-205 severely affect the registration of the image sequence 200. Here, the reference image 203 is effectively established based on a majority selection.

In general, the alignment processor 160 may be arranged for establishing an interpolated image as the reference image, the interpolated image having a position in the image range between a pair of consecutive images in the image sequence 200. Hence, instead of selecting one of the plurality of images 201-205 as the reference image 203, an interpolated image may be established, e.g., by explicitly calculating the interpolated image or by establishing a position between a pair of consecutive images which corresponds to that of the interpolated image. It will be appreciated that, having established a transformation between a pair of consecutive images, it is possible to derive a transformation to a position in between the pair of consecutive images. For example, if the transformation is a motion vector-based transformation, a transformation to a position in between a pair of consecutive images may be established by halving a size of the motion vectors. Hence, based on the plurality of transformations 211-214, it is possible to quantify a degree of transformation required for aligning the image sequence 200 to a position in between a pair of consecutive images. The alignment processor 160 may be arranged for establishing an interpolated image which minimizes the transformation metric. The image sequence 200 may then be aligned to said interpolated image to obtain the registered image sequence. It is noted that the interpolated image may not need to be part of the registered image sequence, i.e., it may only serve as a reference image in the registration of the image sequence 200.

In general, the alignment processor 160 may be arranged for generate a confidence value 250 based on the transformation metric, the confidence value being indicative of a quality of aligning the image sequence 200 to the reference image 203. For example, when the transformation value corresponding to the reference image 203 exceeds a threshold, this may be indicative of a high degree of transformation required for aligning the image sequence 200. Such a high degree of transformation may be associated with, e.g., the transformation processor 140 erroneously establishing transformations, the image sequence 200 being so irregular that image registration is not possible, etc. The confidence value 250 may be displayed to the user so as to provide feedback on the image registration.

In general, the alignment processor 160 may be arranged for establishing the reference image 203 from the plurality of images 201-205 further based on an image similarity metric, the image similarity metric quantifying a degree of correspondence obtained when aligning the image sequence 200 to the reference image 203. The image similarity metric may be any suitable metric as known from the technical field of image processing, such as the Mean-Squared Error (MSE). For example, the alignment processor 160 may, in addition to establishing a transformation value for the first image 201, calculate an image similarity value for the first image 201 by calculating the MSE between the first image 201 and the second image 202 after being aligned to the first image 201, between the first image 201 and the third image 203 after being aligned to the first image 201, etc. The sum of the MSE's may then serve as the image similarity value for the first image 201. Image similarity values for the second, third, fourth and fifth images 202-205 may be calculated accordingly. The choice of the reference image 203 may subsequently be based on a minimization of both the transformation metric and the image similarity metric, e.g., by establishing one of the plurality of images 201-205 as the reference image 203 which is associated with the lowest sum of transformation value and image similarity value In general, the transformation metric may quantify a degree of transformation required for aligning the image sequence 200 to the reference image 203 by quantifying the quality of an integrated image derived from the registered image sequence 230. The integrated image may be a difference map derived from the registered image sequence 230. The difference map may be a quantitative map, such as a T1, T2, T2*, or perfusion map.

In general, the alignment processor 160 may be arranged for establishing the reference image 203 from the plurality of images 201-205 further based on a position of the reference image within the image range. For example, when several of the plurality of images 201-205 have an equally low transformation value, one of said images may be established as the reference image 203 which is located most centrally within the image range.

It will be appreciated that the present invention may be advantageously applied in the medical domain. In the following, an example is provided of applying the present invention to compensate for respiratory motion and/or patient motion in perfusion CMR image sequences. It is noted, however, that the present invention is also applicable to image sequences from other anatomies and modalities, such as CCT, Echocardiography, etc, and in applications such as motion compensated image reconstruction for any medical imaging modality, post-processing application for medical image sequences, or in a geometry driven diffusion filter for medical image sequences. However, the present invention is not limited to the medical domain, i.e., may be equally applied to a non-medical domain, such as for registering image sequences from a handheld camera operated by an end-user.

The respiratory motion in perfusion CMR image sequences may be compensated by performing affine image registration in a so-termed cascading scheme. The image registration may be performed in a rectangular region of interest (ROI). The transformation metric may quantify the displacement of the ROI corners throughout the image sequence as a metric of the degree of transformation, i.e., the transformation amplitude. The alignment processor may employ a transformation minimization algorithm which quantifies the mean displacement, e.g., in mm, throughout the image sequence while varying the reference image. The alignment processor may then select one of the images which results in the smallest mean displacement of the ROI corners as the reference image.

The transform minimization may be a purely geometric operation, e.g., involving 4×4 matrix algebra and distance computations only. Such geometric operations are computationally efficient, allowing the transform minimization to be rapidly performed by a processor system. In addition, it is possible to include an image similarity metric. It is noted, however, that this may increase the computational cost, i.e., decrease the computational efficiency. The transform minimization may minimize affine transforms. However, the transformations may also exhibit less or more degrees of freedom, with the transform minimization remaining computationally efficient if the transformations are invertible.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:
1. A system for registering an image sequence, comprising:
an input for obtaining the image sequence, the image sequence comprising a plurality of images arranged sequentially within an image range;
a transformation processor for establishing transformations between adjacent pairs of consecutive images in the image sequence to obtain a plurality of transformations as transformation matrices;
an alignment processor for, based on the plurality of transformations, aligning the image sequence to a reference image to obtain a registered image sequence, the alignment processor being arranged for:
establishing the reference image from the plurality of images based on a transformation metric, the transformation metric quantifying a degree of transformation required for aligning the image sequence to the reference image, wherein the alignment processor is arranged for quantifying the degree of transformation in accordance with the transformation metric based on multiplication of the transformation matrices of the adjacent pairs of consecutive images, and
establishing an interpolated image as the reference image, the interpolated image having a position in the image range between a pair of consecutive images in the image sequence.

2. The system according to claim 1, wherein the alignment processor is further arranged for establishing a region of interest in the image sequence, and wherein the transformation metric quantifies a degree of transformation required for aligning the region of interest in the image sequence to the region of interest in the reference image.

3. The system according to claim 2, further comprising a region of interest detector for detecting the region of interest in the image sequencer.

4. The system according to claim 1, wherein the alignment processor is further arranged for quantifying the degree of transformation by i) for each of the plurality of images, establishing a transformation matrix product being indicative of the transformation from a respective one of the plurality of images to the reference image, and ii) establishing a transformation value based on a sum of the transformation matrix products.

5. The system according to claim 1, wherein the alignment processor is further arranged for generate a confidence value based on the transformation metric, the confidence value being indicative of a quality of aligning the image sequence to the reference image.

6. The system according to claim 1, wherein the alignment processor is further arranged for establishing the reference image from the plurality of images further based on an image similarity metric, the image similarity metric quantifying a degree of correspondence obtained when aligning the image sequence to the reference image.

7. The system according to claim 1, wherein the alignment processor is further arranged for establishing the reference image from the plurality of images further based on a position of the reference image within the image range.

8. A method for establishing a reference image from an image sequence and registering the image sequence with the established reference image, the method comprising:
obtaining the image sequence, the image sequence comprising a plurality of images arranged sequentially within an image range;
establishing transformations between adjacent pairs of consecutive images in the image sequence to obtain a plurality of transformations as transformation matrices;

establishing the reference image from the plurality of images based on a transformation metric, the transformation metric quantifying degree of transformation required for aligning the adjacent pairs of consecutive images of the image sequence; and based on the plurality of transformations, aligning the image sequence to the reference image to obtain a registered image sequence.

9. A non-transitory computer-readable medium carrying instructions for causing a processor system to perform the method according to claim 8.

10. The method according to claim 8, further including:
quantifying the degree of transformation in accordance with the transformation metric based on multiplication of the transformation matrices of the adjacent pairs of consecutive images.

11. A system for establishing a reference image from an image sequence and registering images of the image sequence to the established reference image, the system comprising:
a computer processor configured to:
receive the image sequence, the image sequence including a plurality of images arranged sequentially within an image range;
determine transformations which transform adjacent pairs of consecutive images of the plurality of images arranged sequentially within the image range;
quantify a degree of transformation of each of the plurality of transformations for aligning the adjacent pairs of sequential images;
based on the quantified degrees of transformation and the images of the image sequence, establish the reference image; and
align the plurality of images of the image sequence with the reference image to generate a registered image sequence.

12. The system according to claim 11, further including:
a display device configured to display the images of the registered sequence sequentially.

13. The system according to claim 12, further including:
a diagnostic imaging apparatus configured to generate the plurality of images of the image sequence.

14. The system according to claim 11, wherein establishing the reference image includes selecting one of the images of the image sequence as the reference image based on selecting an image which minimizes the degree of transformation.

15. The system according to claim 11, wherein the one or more computer processors are further configured to establish the reference image by:
arranging the transformation as transform matrices;
multiplying the transform matrices of the adjacent pairs of consecutive images to quantify the degree of transformation.

16. The system according to claim 11, wherein the computer processor is further configured to:
calculating the degree of transformation based on at least a subset of the images of the image sequence and selecting as the reference image an image having a lowest degree of transformation.

17. The system according to claim 11, wherein the one or more computer processors are further configured to:
identifying one or more regions of interest in the images of the image sequence;
quantify the degree of transformation based on transformations for aligning the identified region of interest of the images in the image sequence.

18. The system according to claim 11, wherein the one or more computer processors are further configured to:
establish the degrees of transformation based on a sum of the transformations for aligning the consecutive images of the image sequence.

19. The system according to claim 11, wherein the one or more computer processors are further configured to:
generate a confidence value indicative of a quality of aligning the image sequence to the reference image based on the degrees of transformation for registering the images of the image sequence to the reference image.

20. The system according to claim 11, wherein the computer processor is further configured to:
establish the reference image based on a similarity metric which quantifies a degree of correspondence obtained when aligning the images of the image sequence to the reference image.

* * * * *